United States Patent Office 3,486,769
Patented Dec. 30, 1969

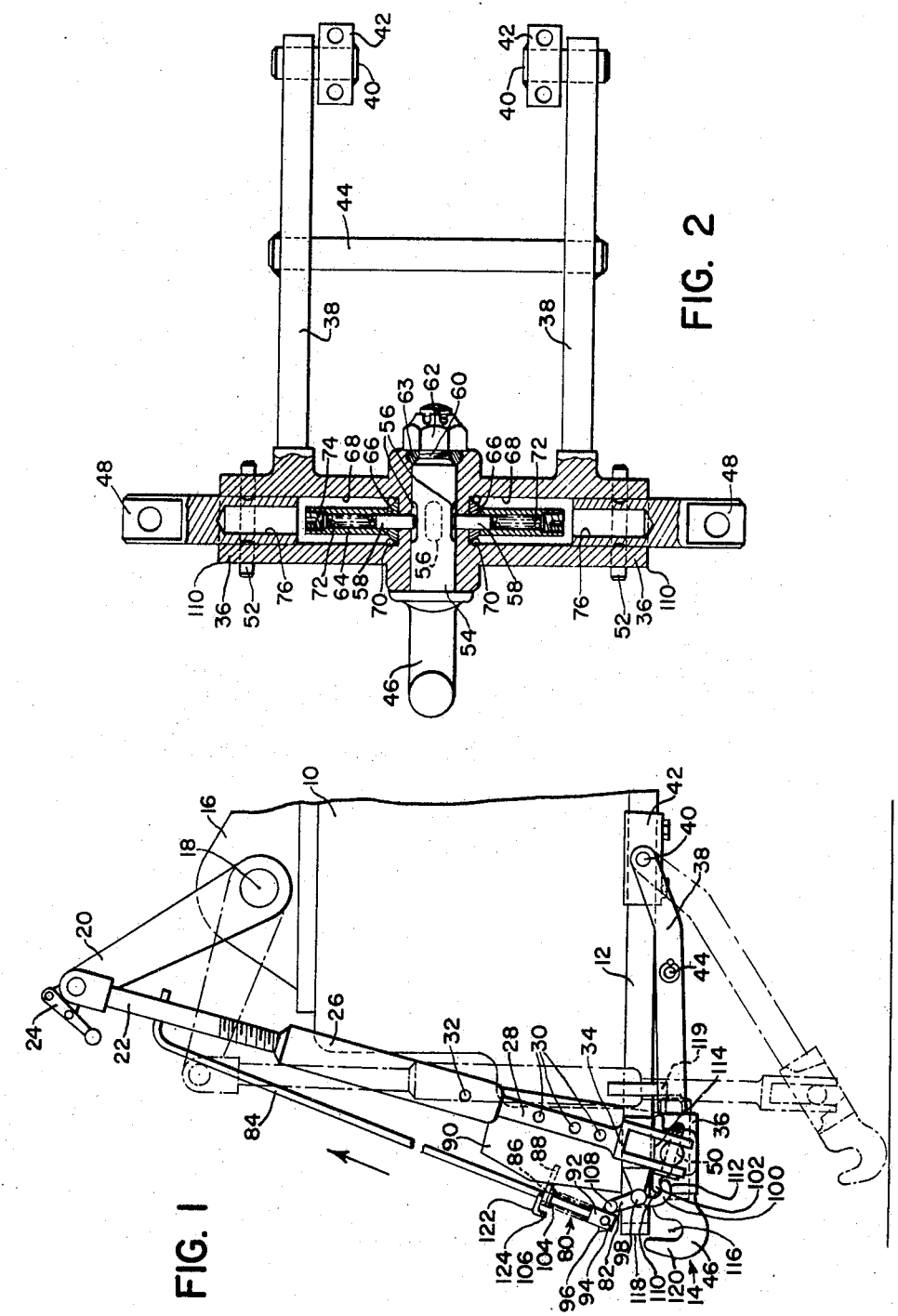

3,486,769
COUPLING MECHANISM
Ludwig Munske, Morlenbach, Josef Buchmuller, Mannheim, and Gerhard Gross, Wiesental, Germany, assignors to Deere & Company, Moline, Ill., a corporation of Delaware
Filed Jan. 22, 1968, Ser. No. 699,462
Claims priority, application Germany, Jan. 26, 1967,
D 52,106
Int. Cl. B60d 1/04
U.S. Cl. 280—479    7 Claims

ABSTRACT OF THE DISCLOSURE

A coupling mechanism for the quick attachment of trailers and the like to farm tractors. The coupling mechanism is pivotally attached to the tractor at one end, has a hook at the other end, includes a latching device which normally holds the coupling mechanism in a raised position, and is provided with extendible and retractable pins which are optionally connectible with the power operated lift arms of the tractor so that the lift arms can lower the hook end of the coupling mechanism to engage a trailer tongue and raise it to the normal trailing position. When the lift arms are used with the conventional draft links, the pins on the coupling mechanism are retracted so they will not interfere with the movement of the draft links.

BACKGROUND OF THE INVENTION

This invention relates to a coupling mechanism which is pivotally attached to a tractor for vertical movement and is operated by the lift arms of the tractor. The coupling mechanism can be lowered by the lift arms through appropriate manipulation of the conventional power lift system so as to engage the tongue of a trailer, for example, a one axle trailer, and then raised by the lift arms through appropriate manipulation of the conventional power lift system to bring the trailer tongue to its proper draft position.

Various coupling mechanisms of the class operated by the power lift arms of the tractor have been previously constructed, but each has had inherent disadvantages. In one known coupling mechanism of the above class, the tractor was provided with two pairs of lift arms which were operated simultaneously by the tractor power lift system. One pair of the lift arms was connected to the draft links for vertical movement of the draft links while the second pair of lift arms was connected to the coupling mechanism for vertical movement of the coupling mechanism. An inherent disadvantage of this coupling mechanism was that the coupling mechanism could not be operated without simultaneous operation of the draft links. In other known coupling mechanisms, the tractor was provided with a complicated linkage system between the lift arms and coupling mechanism which would transmit the motion of the lift arm to the coupling mechanism only when the coupling mechanism was in its lower position and the lift arms were being moved to the raised position. This system had the advantage of allowing operation of the draft links without simultaneous operation of the coupling mechanism, but retained the disadvantage of requiring simultaneous operation of the draft links when the coupling mechanism was operated.

SUMMARY OF THE INVENTION

The object of the present invention is to provide a coupling mechanism operated by the power lift arms of a tractor and which allows for the independent operation of either the coupling mechanism or the conventional draft links.

Still another object of the present invention is to provide a coupling mechanism having mounting pins which are connectible to the lift arms of the tractor, and which can be moved to an inoperative position when the lift arms of the tractor are connected to the conventional draft links so that the mounting pins will not interfere with the operation of the draft links.

Still another object of the present invention is to provide a latching mechanism which will normally hold the coupling mechanism in its raised position, but is manually releasable to allow the coupling mechanism to be lowered by the tractor lift arms.

The objects of the present invention are accomplished by providing a coupling mechanism which is pivotally attached to the tractor for vertical movement and which includes an implement-engaging hook element on its free end. A latching element is provided on the tractor to normally hold the coupling mechanism in its raised position, but is manually releasable to allow the coupling mechanism to move to its lowered position. The coupling mechanism is provided with laterally extending mounting pins which are movable between an extended position and a retracted position and which can be engaged with the lift arms of the tractor when in the extended position. The tractor lift arms can be disconnected from the conventional draft links for connection with the coupling mechanism mounting pins. With the lift arms disconnected, the draft links can be connected to the tractor in any suitable manner which will not interfere with the operation of the coupling mechanism. When the tractor lift arms are connected to the draft links for operation of the draft links, the mounting pins on the coupling mechanism can be moved to the retracted position so they will not interfere with the operation of the draft links.

The coupling mechanism according to the present invention has the inherent advantages of not requiring any additional linkage for the operation of the coupling mechanism, and of permitting the independent operation of either the coupling mechanism or the conventional draft links.

The above objects and advantages of the present invention will become more apparent from a reading of the following detailed description taken in conjunction with the accompanying drawings.

BRIEF DESCRIPTION OF THE DRAWINGS

In the drawings:

FIG. 1 is a view in side elevation illustrating the rear portion of a tractor provided with a coupling mechanism according to the present invention, the dotted lines illustrating the coupling mechanism in a lowered position; and FIG. 2 is a sectional view of the coupling mechanism illustrated in FIG. 1.

DESCRIPTION OF THE PREFERRED EMBODIMENT

Referring now to the drawings, a tractor transmission housing 10 is illustrated as having a drawbar 12 and a coupling mechanism 14 according to the present invention mounted thereon. A control housing 16 is mounted on the top side of the transmission housing and has a rockshaft 18 for a power lift system journaled therein. Crank arms 20 are mounted on the rockshaft for rotary movement therewith and have lift arms 22 depending therefrom. The lift arms 22 take the form of screw jacks and each is provided with a suitable adjusting mechanism 24 to change its length. The lower portion of each lift arm 22 is provided with a casing 26 which telescopically receives a tube 28 so that if a major length adjustment of the lift arms 22 is required, it can be quickly accomplished by extending or retracting the tube 28 with respect to casing 26. To retain the tube 28 in its adjusted position, a plurality of bores 30 are provided in the tube 28 and cooperate with a bore 32 in the casing 26 and through which a suitable pin (not illustrated) can be inserted. Each tube 28 terminates in a fork 34 which is optionally connectible to either a draft link (not illustrated) of the conventional three-point hitch or with the coupling mechanism 14 in a manner which will be more fully explained hereinafter.

The coupling mechanism 14 includes a transverse hook carrying member 36 which is secured adjacent each of its ends to the trailing end of a draft arm 38. The draft arms 38 are pivotally secured to the transmission housing 10 by pivot pins 40 which extend through the draft arm 38 and bearing blocks 42 which are bolted or otherwise suitably secured to the transmission housing 10. A spacer 44 extends between the draft arms 38 at a point adjacent their forward end and is suitably secured thereto in any convenient manner to form a more sturdy construction. As can best be seen in FIG. 2, a draft hook 46 is carried at the center of the transverse member 36, and mounting pins 48 extend laterally from the ends of the transverse member 36.

The hook 46 is rotatably mounted on the transverse memebr 36 by a shank 54 which extends through the transverse member 36. The shank 54 has a reduced end portion 60 which is suitably threaded for the reception of a nut 62 which holds the shank 54 against axial movement but allows rotary movement thereof. A washer 63 is positioned between the nut 62 and transverse member 36.

In the absence of any abnormal forces tending to rotate the hook 46, it is retained in its normal operative position by spring loaded pins 58 which engage the shank 54. The shank 54 is provided with three flattened surfaces 56 which are spaced about the circumference of the shank 54 at 90° intervals. Two of the flattened surfaces 56 which are positioned diametrically opposite from one another are engaged by the pins 58 when the hook 46 is in its normal operative position, and the third flattened surface 56 is engaged by either one of the pins 58 when the hook 46 is rotated through 90° to an inoperative position for a purpose to be explained hereinafter. The pins 58 have a diameter which is smaller than the width of the flattened surfaces 56 so that if the hook 46 is turned to only a slight angle, the force of the pins 58 acting on the flattened surfaces 56 will return the hook 46 to its normal operative position.

On each side of the hook 46 the transverse member 36 is provided with a bore 68 which extends from the outer extremity to a point adjacent the hook 46. A bushing 64 is provided at the inner end of each bore 68 to guide the spring loaded pins 58. A thrust ring 66 is secured in any well-known manner to the inner end of each bushing 64 and is retained within the bore 68 by a snap ring 70. A compression spring 72 is positioned within each bushing 68 and provides the loading force on the pins 58. Each spring 72 acts between a pin 58 and a closure member 74 for the bushing 64. The springs 72 provide the pins 58 with sufficient force to retain the hook 46 in its adjusted position as long as the hook is not acted upon by some abnormal force which tends to rotate it.

The mounting pins 48 are slidably received within the bores 68 so as to be optionally extendible or retractable from and into the bores 68. To reduce the overall width of the coupling mechanism, the mounting pins 48 are provided with bores adjacent their inner end which are of a size to receive the bushings 64 when the mounting pins 48 are moved to their retracted position. The mounting pins 48 are secured in either the retracted or extended positions by locking pins 52 which extend through bores provided in the transverse member 36 and the mounting pins 48.

A retainer mechanism indicated generally at 80 is provided to retain the coupling mechanism 14 in its raised, draft position. The retainer mechanism 80 includes latches 82 which are operated by a pull rod 84 which is positioned so as to be operable by the tractor operator while remaining in the tractor seat. The pull rod 84 is guided in a slot 86 which is provided in a support member 88 which is mounted between and carried by plates 90. The plates 90 are mounted on the transmission housing 10 and are spaced apart a distance corresponding to the width of the transverse member 36. The latches 82 are joined together by a shaft 108 so that a single pull rod 84 can be used for simultaneous operation of both latches. A single arm 96 is secured to the shaft 108 and is pivotally secured between the legs 94 of the fork head 92 on the lower end of pull rod 84. The latches 82 are pivoted at 98 on a support which may be mounted directly to the housing 10 or to the plates 90. The lower portion of the latches 82 are curved to form a hook 100 which will engage beneath a protuberance 102 on the transverse member 36. The latches 82 are normally held in engagement with the transverse member 36 by a compression spring 104 which acts between the support 88 and the fork head 92. In the event it is desired to maintain the latches 82 in their released position, the pull rod 84 is provided with a catch 122 whose free bent end 124 will engage the upper surface of the support 88 when the pull rod 84 is moved upwardly and toward the tractor.

The operation of the above-described coupling mechanism is as follows. With the mounting pins 48 extended from the bores 68, the forks 34 on the lift arms 22 can be disconnected from the draft links and secured to the mounting pins 48 by suitable pins 50 extending through the fork 34 and the mounting pins 48. The draft links are then secured to the housing 10 in any suitable manner so as to not interfere with the working of the coupling mechanism 14. Upon releasing the latches 82 by lifting movement of the pull rod 84 in the direction of the arrow illustrated alongside the pull rod, the operator of the tractor can lower the coupling mechanism to the position illustrated by dotted lines in FIG. 1 by operation of the conventional power lift system. If necessary, the lift arms 22 can be lengthened so that the hook 46 can be lowered to the position illustrated by the dotted lines in FIG. 1. The tractor will now be backed a sufficient amount to bring the hook 46 under the tongue of the trailer or other implement which rests on the ground.

With the hook 46 under the tongue of the trailer, the tractor operator will again appropriately manipulate the power lift system to raise the coupling mechanism 14. As the coupling mechanism approaches its raised position, the corner edges 110 of the transverse member 36 will bear against the sloped underside 112 of the hooks 100 and rotate the latches 82 clockwise about the pivot 98, and as a result of the spring 104, the latches 82 will return to their normal locking position as soon as contact with the transverse member 36 ceases. Upward movement of the coupling mechanism 14 is limited by engagement between the drawbar 12 and the transverse member 36 as at 114. The latches 82 are designed to engage under the protuberances 102 prior to engagement between the drawbar 12 and transverse member 36 so that when the coupling mechanism 14 is carried by the retainer mechanism 80, it will not bear against the drawbar 12.

To prevent the trailer tongue from becoming disengaged from the hook 46 during travel over uneven surfaces or the like, the hook 46 is provided with a long point 120 which assumes a position closely adjacent to the extended end 118 of the drawbar 12 when the coupling mechanism is in its raised position so as to cover the hook opening 116.

When it is desired to release the trailer tongue, the coupling mechanism 14 is first raised to the position where it abuts against the drawbar 12 so that the weight of the coupling mechanism will not be carried by the hooks 100 and the latches 82 can easily be released by manipulation of the pull rod 84. With the latches 82 released, the coupling mechanism 14 can be lowered to the ground to release the trailer tongue.

If the hook 46 is rotated through 90° so that the hook point 120 lies in a horizontal plane, the draw frame 12 can be employed to pull an implement while the coupling mechanism 14 is in its raised position. The hook 46 will be retained in the horizontal position by one of the spring loaded pins 58 acting against the third flattened surface on the shank 54. If the drawbar 12 is of the swinging type, it can be maintained in its central position by a suitable retaining pin 119.

If use of the tractor three-point hitch is required, it is simply necessary to raise the coupling mechanism to its raised position where it will be retained by the retaining mechanism 80. The pins 50 are then removed and the lift arms 22 connected to the conventional draft links. After the retaining pins 50 have been removed, the mounting pins 48 are moved to their retracted position within the bores 68 so as to not interfere with vertical movement of the draft links. At this point the lift arms should be readjusted to their original length so that the draft links can be raised a sufficient amount to lift any mounted implement.

It should be understood that the foregoing detailed description of the preferred embodiment is merely exemplary and that the coupling mechanism may take many various forms which will be apparent to those skilled in the art.

We claim:
1. In combination with a tractor having a power lift system including a pair of lift arms detachably connected at their lower ends to a pair of draft links pivoted to the tractor, a coupling means pivotally mounted at one end to the tractor and having a coupling element at its free trailing end, telescopic connecting means extending laterally from each side of said coupling means adjacent the trailing end thereof, said connecting means having an extended position and a retracted position, said connecting means when in the extended position being optionally connectible with the lower ends of said lift arms when said lift arms are detached from said draft links whereby said lift arms are optionally operative to pivot either said draft links or said coupling means between raised and lowered positions.

2. In a device as set forth in claim 1 including releasable latching means secured to the tractor and operative to retain said coupling means in the raised position.

3. In a device as set forth in claim 1 wherein said connecting means includes a housing having a laterally open bore and mounting pin means slidably positioned within said bore for movement between extended and retracted positions.

4. In a device as set forth in claim 3 wherein releasable securing means cooperate with said housing and pin means to secure said pin means in either the extended or retracted positions.

5. In a tractor hitch for application to a tractor having draft links pivotally attached to the tractor and power operated lift arms having their lower ends detachably connected to the draft links, an elongated coupling means pivotally mounted at its forward end to the underside of the tractor and having a coupling element at its trailing end, a laterally extending housing on each side of said coupling means adjacent the trailing end thereof, connecting means extending from each housing and being engageable with said lift arms when said lift arms are detached from said draft links whereby said lift arms can optionally raise and lower either said draft links or said coupling means, said connecting means being movable into said housing when not engaged by said lift arms so as to not interfere with the movement of said draft links when said lift arms are connected to said draft links.

6. In a device as set forth in claim 5 wherein said coupling means is positioned intermediate said draft links.

7. In a device as set forth in claim 5 wherein said connecting means including mounting pin means slidably mounted within said housing.

References Cited
UNITED STATES PATENTS

| 2,786,695 | 3/1957 | Wilson | 280—479 |
| 2,791,444 | 5/1957 | McNeice | 280—479 |
| 2,826,433 | 3/1958 | Poole | 280—479 |
| 2,912,258 | 11/1959 | Maughan | 280—479 |
| 2,926,931 | 3/1960 | Crampton et al. | 280—479 |
| 3,241,861 | 3/1966 | Marindin | 280—479 |

LEO FRIAGLIA, Primary Examiner

M. L. SMITH, Assistant Examiner

U.S. Cl. X.R.
172—272